L. DINESEN.
MILKING APPARATUS.
APPLICATION FILED AUG. 30, 1909.
1,072,584.
Patented Sept. 9, 1913.
2 SHEETS—SHEET 2.
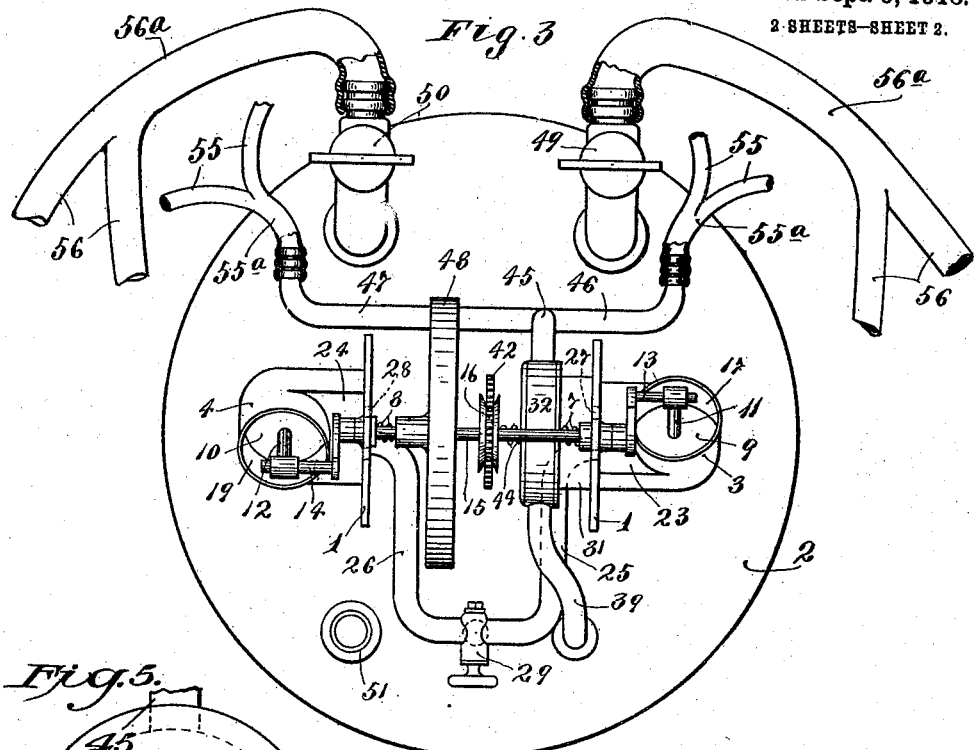
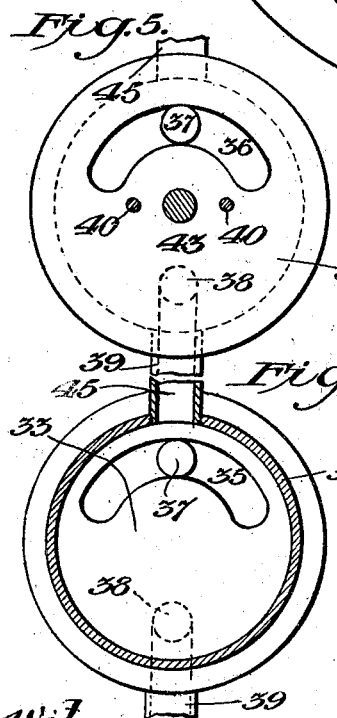
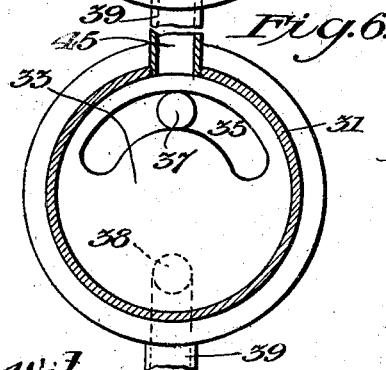
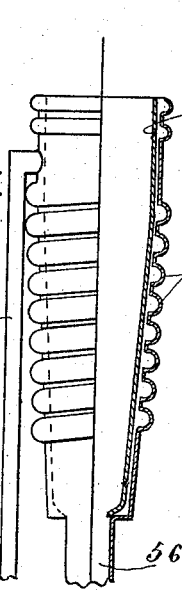
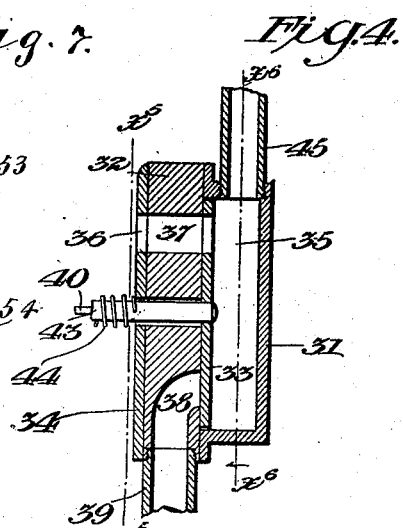
Witnesses.
A. H. Opsahl
W. H. Souba
Inventor
Laurits Dinesen
By his Attorneys
Williamson Merchant

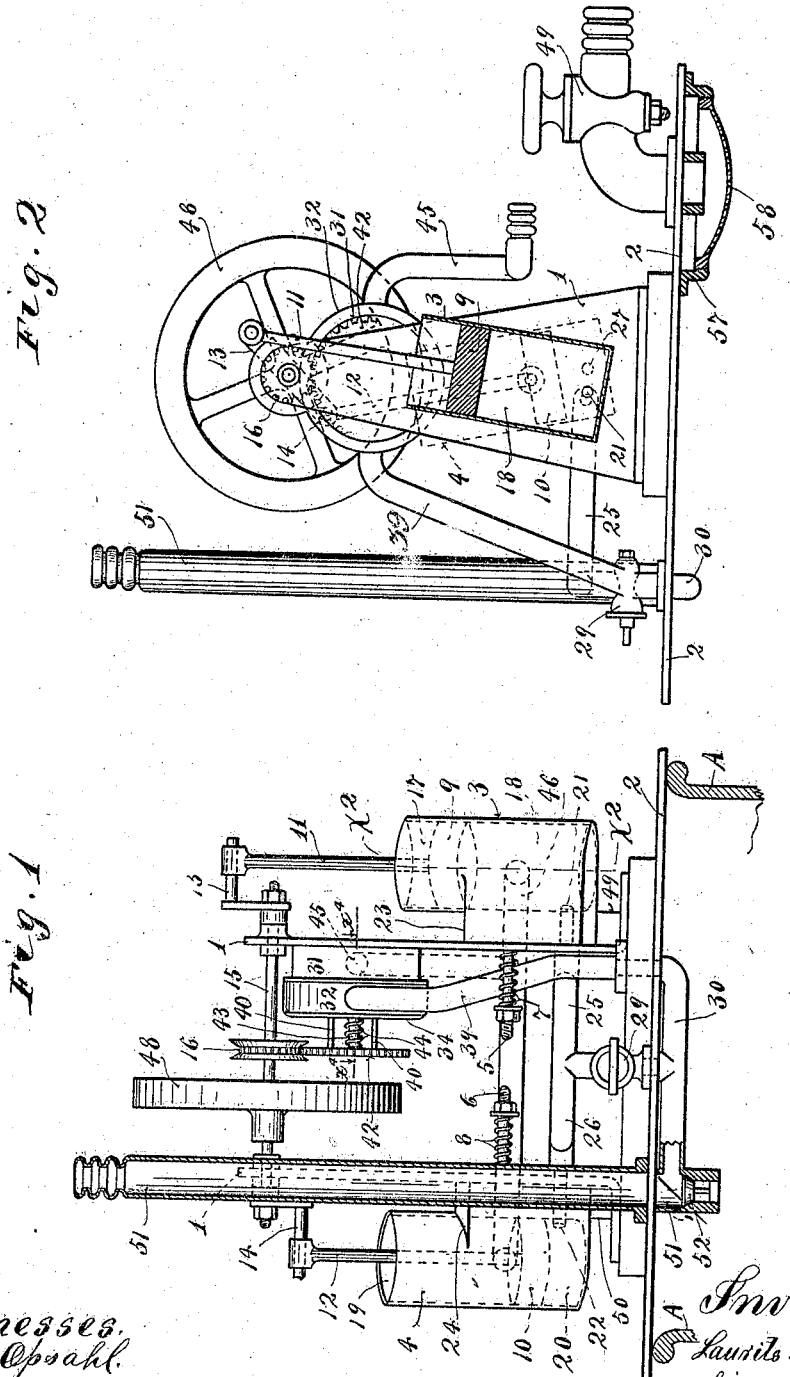

UNITED STATES PATENT OFFICE.

LAURITS DINESEN, OF VEILE, DENMARK.

MILKING APPARATUS.

1,072,584.

Specification of Letters Patent.

Patented Sept. 9, 1913.

Application filed August 30, 1909. Serial No. 515,265.

*To all whom it may concern:*

Be it known that I, LAURITS DINESEN, a subject of the King of Denmark, residing at Veile, Province of Jylland, and Kingdom of Denmark, have invented certain new and useful Improvements in Milking Apparatus; and I do hereby declare the following to be a full, clear, and exact description of the invention, such as will enable others skilled in the art to which it appertains to make and use the same.

My invention relates to milking apparatus, and has for its object to improve the same in the several particulars hereinafter noted.

The invention consists of the novel devices and combination of devices hereinafter described and defined in the claims.

In the acompanying drawings which illustrate the invention, like characters indicate like parts throughout the several views.

Referring to the drawings, Figure 1 is a view, chiefly in front elevation, but with some parts in section showing those parts of the milking apparatus which are applied to a pail cover; Fig. 2 is a side elevation of the parts shown in Fig. 1, some parts being sectioned; Fig. 3 is a plan view of the parts shown in Figs. 1 and 2; Fig. 4 is a detail, in horizontal section, on an enlarged scale taken on the line $x^4$ $x^4$ of Fig. 1, showing a valve mechanism for intermittently varying the pressure in the teat cups; Fig. 5 is a detail view principally in side elevation but with some parts sectioned on the line $x^5$ $x^5$ of Fig. 4; Fig. 6 is a section taken on a line $x^6$ $x^6$ of Fig. 4, and Fig. 7 is a view partly in side elevation and partly in section showing one of the teat cups.
The principal parts of the machine are supported by upright bearing plates 1, secured at their lower ends to a cover 2, that detachably fits the upper end or mouth of the milk can A, and closes the same with an air tight joint. A pair of oscillating cylinders 3 and 4, which are open at their upper ends, are pivotally connected to the bearing plates 1 by bolts 5 and 6. On their sides, adjacent to the bearing plates 1, the cylinders are formed with flat faced bearing blocks 23 and 24 that are tightly drawn against the said bearing plates by springs 7 and 8, shown as applied respectively to the pivot bolts 5 and 6, and compressed between the plates 1 and nuts applied on the said bolts.

In the cylinders 3 and 4 are pistons 9 and 10 provided respectively with rigidly secured upwardly extended piston rods 11 and 12 that are pivotally connected respectively to cranks 13 and 14 of a shaft 15 that is journaled in the upper portions of the frame plates 1. This shaft 15 carries a spur gear 16. The pistons 9 and 10 divide the cylinders 3 and 4 respectively into compartments 17—18 and 19—20. From compartments 18 and 20, ports 21 and 22 respectively lead out through the bearing blocks 23 and 24 of the cylinders 3 and 4, and are adapted to be connected alternately with tubes 25 and 26 respectively, or with the atmosphere through ports 27 and 28. The branch tubes 25 and 26 are connected, through a normally open valve or stop cock 29, with a branch tube 30. The cylinder compartments 18 and 20 are connected with this branch tube 30, when the respective piston is nearest to the open upper end of its operating cylinder.

On the right bearing plate 1, as seen in Fig. 1, is a valve mechanism shown on an enlarged scale in Figs. 4, 5 and 6. This valve mechanism comprises a valve box 31, that is rigidly secured to the cover 32 of said box. Rotatively mounted respectively on the inner and outer sides of the cover 32, is a pair of disk like valves 33 and 34 provided respectively with segmental ports 35 and 36. The cover 32 is provided with ports 37 and 38, the former of which extends completely through said cover and is adapted to intermittently connect the two ports 35 and 36 to the atmosphere, while the said port 38 is located diametrically opposite to the central portion of the port 37 and is adapted to be intermittently opened by the said port 35. Furthermore, said port 38 is permanently connected to the branch tube 30 through a tube 39. The inner valve 33 is rigidly secured to the inner end of a shaft 43, the outer end of which is secured for rotation with a spur gear 42 that meshes with a spur gear 16, and is journaled in a suitable bearing, not shown. The outer valve 34 (see Fig. 1) is caused to rotate with a gear 42 by a pair of pins 40 preferably secured to said valve and arranged to work through perforations in said gear. A spring 44 which surrounds the shaft 43 reacts against the gear 42 and holds the valves 33 and 34 seated against the cover 32, while free for rotation.

From the valve box 31 extends the tube 45, which preferably terminates in branches 46 and 47 (see Figs. 3 and 4). On the shaft 15 is a fly wheel 48. Secured to, and opening upward through the cover 2, is a pair of stop cocks 49 and 50, and a suction tube 51. The lower end of this suction tube 51 extends below the cover 2 and is connected to the branch pipe 30 already noted, and below this branch tube said suction tube 51 is provided with a check valve 52, which prevents atmospheric air from the branch pipe 30 from being admitted into the milk can A. The upper or outer end of this air suction tube 51 is connected to a suitable vacuum pump or suitable means for producing suction or partial vacuum.

In practice, four teat cups will usually be employed in connection with each milk pail attachment and these teat cups will be connected to the stop cocks 49 and 50 in pairs. In the drawings, only one of these teat cups is shown, but all will be alike. The inner body portion 53 of this teat cup is made of flexible material and is so constructed that it will quite closely fit the cow's teat. This teat cup is provided with an air tight jacket or surrounding chamber formed between the same and an outer shell 54 of stiff or non-collapsible material that is preferably formed with a spiral corrugation to increase its ability to withstand atmospheric pressure, when the partial vacuum is created within the same. The air chambers between the teat cups and surrounding jackets are connected to flexible branch tubes 55 of flexible tubes 55ª, which latter are connected, one to each of the branch tubes 46—47, (see Figs. 3 and 7). The teat cups 53, at their lower extremities, are connected respectively to flexible branch tubes 56 of flexible milk tubes 56ª to the stop cocks 49—50, (see also Figs. 3 and 7). Secured to the under side of the cover 2, just below the inner extremity of each stop cock 49—50, and detachably held by means of annular holders 57, are strainers 58.

When the cows are to be milked, the suction tube 51 must, of course, be connected to the vacuum pump, or means for producing partial vacuum; and while the valves 29, 49—50 are closed, air is pumped from the milk can. Then the flexible tubes 55ª and 56ª should be connected respectively to the branch pipes 46—47 and stop cocks 49—50, if they have not previously been so attached. When this has been done, the teat cups should be placed on the cow's teats and the stop cocks 49—50 should then be opened so as to cause the teat cups to suck themselves tight around the teats. When the stop cock 29 is opened, the air is, in the one instance, drawn out of the lower compartment 18 of cylinder 3, and this causes piston 9 to be driven downward by atmospheric pressure. When said piston has reached its lowest position, said cylinder 3 will have been oscillated on its pivot bolt 5 to such an extent that connection between tube 25 and port 21 is cut off, but at the same time, said port 21 will be connected to port 27, which latter it will be remembered, opens to the atmosphere, so that air will then enter the said cylinder compartments 18 and permit free return or upward movement of the coöperating piston 9. While the said piston 9 is making its return or upward movement, the piston 10 and the cylinder 4 will be drawn downward by a duplication of the above described action of drawing downward the said piston 9. Hence, under the action of the two reciprocatory cylinder and piston engines, a continuous rotary motion is imparted to the shaft 15, and through the gears 16 and 42, to the two valves 33 and 34 of the mechanism for intermittently varying the pressure in the teat cups.

When the valves 33 and 34 are in position (see Fig. 4) to admit atmospheric air into the valve box 31, air will be admitted through said box and through tubes 45, 46, 55ª and 55, to the air chambers which surround the teat cups 53, within the outer casings or shells 54; and as the travel of this incoming air is from the tops toward the bottoms of the teat cups, due to the spiral corrugation of the shell 4, the cow's teats will receive a downward pressure and downward stretching action, in a manner which is almost identical with the manner in which they are pinched and stretched by a hand milking action.

When the ports 35 and 36 of the valves 33 and 34 have been rotated until they reach port 38, atmosphere will be cut off from the valve box 31, and the latter will be connected to the vacuum pump, through tubes 39, 30 and 51, and the partial vacuum will then be produced in the air chambers surrounding the teat cups, thereby loosening or expanding the teat cups and permitting internal suction from within the same to draw the teat cups upward on the cow's teats, and at the same time, permits the cow's teats to be expanded almost in the same way in which they expand, in hand milking, when the grip of the hand is released therefrom. The teat cups, in this way, intermittently move upward and downward on the teats, and this together with the varying pressure and resulting expansion and contraction of said teat cups, produces a milking action of the highest possible efficiency, which at the same time is agreeable to the cow.

With the above described apparatus, the pressure or degree of suction in the milk can or receptacle is not changed, or in other words, this is not an apparatus wherein pulsations or intermittent variations in pressure are produced in the main pipes or even in a milk delivery pipe in the system. The milking action is produced by varying pressure intermittently directly on the teat cups.

What I claim is:

1. The combination with a milk receptacle and a suction tube extending therefrom, a flexible cup provided with a surrounding air chamber, a milk conduit extending from said cup to said milk receptacle, a pressure regulating tube extending from said section tube to the surrounding chamber of said teat cup, a rotary pressure controlling valve mechanism for intermittently connecting said pressure regulating tube to the atmosphere and to said suction tube, and means for rotating said valve mechanism comprising a crank shaft, an oscillatory cylinder and piston motor connected to said crank shaft, and means operative under oscillatory movement of said motors to intermittently and alternately connect said cylinder to the atmosphere and to said suction tube, substantially as described.

2. The combination with a closed milk receptacle and a suction tube extending therefrom and provided with a check valve for preventing air from entering said milk receptacle, a flexible teat cup provided with a surrounding air chamber having a non-collapsible outer wall, a milk conduit extending from said teat cup to said milk receptacle, a pressure regulating tube extending from said suction tube to the surrounding chamber of said teat cup, a rotary pressure controlling valve mechanism for intermittently connecting said pressure regulating tube to the atmosphere and to said suction tube, and means for rotating said valve mechanism comprising a shaft with cranks set one ahead of the other, a pair of oscillatory cylinder and piston motors connected to said crank shafts, and means operative under oscillatory movements of said motors to intermittently and alternately connect said cylinders to the atmosphere and to said suction tube, substantially as described.

In testimony whereof I affix my signature in presence of two witnesses.

LAURITS DINESEN.

Witnesses:
A. REFSHANGE,
K. NIELPIN.